United States Patent [19]

Watanabe et al.

[11] Patent Number: 5,266,177

[45] Date of Patent: Nov. 30, 1993

[54] PROCESS FOR PREPARING REACTION LAYER OF GAS PERMEABLE ELECTRODE

[75] Inventors: Masahiro Watanabe, No. 2-10, Kitashin 1-chome; Nagakazu Furuya, No. 4-3-31, Ohte 2-chome, both of Kofu-shi, Yamanashi; Satoshi Motoo, deceased, late of Yamanashi; Natsuko Motoo, executor, Kashiwa, all of Japan

[73] Assignees: Tanaka Kikinzoku Kogyo K.K.; Masahiro Watanabe; Satoshi Motoo,; Estate of; Nagakazu Furuya, all of Japan

[21] Appl. No.: 716,810

[22] Filed: Jun. 17, 1991

Related U.S. Application Data

[63] Continuation-in-part of Ser. No. 533,376, Jun. 5, 1990, abandoned, which is a continuation-in-part of Ser. No. 356,612, May 23, 1989, Pat. No. 4,931,168.

[51] Int. Cl.$^5$ ............................... C25B 11/12
[52] U.S. Cl. ........................... 204/290 R; 204/294; 429/40; 429/42; 264/105; 264/109
[58] Field of Search ............ 204/284, 294, 290 R, 204/291; 264/105, 109; 429/40, 42

[56] References Cited

U.S. PATENT DOCUMENTS

| | | | |
|---|---|---|---|
| 3,591,670 | 7/1971 | Grangaard | 264/105 |
| 3,634,569 | 1/1972 | Emanuelson et al. | 264/105 |
| 4,435,267 | 3/1984 | Batzold et al. | 204/290 R |

Primary Examiner—Kathryn Gorgos
Attorney, Agent, or Firm—Klauber & Jackson

[57] ABSTRACT

Disclosed herein is a process for preparing a reaction layer of a gas permeable electrode which comprises mixing carbon powder and a hydrophobic binding agent, hot-pressing the mixture and cooling the mixture under the hot-pressing conditions or immediately after the hot-pressing. The reaction layer prepared according to the present invention possesses connected electrolyte passages and gas passages so that all the electrolyte penetrates the electrolyte passages and all the gas penetrates the gas passages, whereby excellent contact efficiency is obtained so as to achieve improved catalyst performance.

5 Claims, 1 Drawing Sheet

PROCESS FOR PREPARING REACTION LAYER OF GAS PERMEABLE ELECTRODE

RELATED APPLICATIONS

This application is a continuation-in-part of our copending application Ser. No. 533,376, filed Jun. 5, 1990, now abandoned. The latter in turn is a continuation-in-part of Ser. No. 356,612, filed May 23, 1989, now U.S. Pat. No. 4,931,168.

BACKGROUND OF INVENTION

The present invention relates to a process for preparing a reaction layer of a gas permeable electrode employed, for example, in a fuel cell, a secondary battery, an electrochemical reactor, an anode for plating or the like.

Heretofore, such gas permeable electrodes have been prepared by mixing carbon powder supporting a platinum catalyst and polytetrafluoroethylene (hereinafter referred to as "PTFE"), pressing the resultant mixture and then sintering it to provide the reaction layer of the gas permeable electrode.

Unfortunately, in a gas permeable electrode so prepared the carbon powder and the PTFE powder may not be desirably sintered as intended by pressing, so that the reaction layer is relaxed by means of high temperature thermal expansion of the powders resulting in electrolyte passages and gas passages that are disconnected. As a result, portions of the platinum catalyst in the reaction layer cannot contact the electrolyte to take part in the reaction. This insufficient contact area between the electrolyte and the gas results in a lowering of the catalyst performance.

SUMMARY OF INVENTION

An object of the present invention is to provide a process for preparing a reaction layer of a gas permeable electrode possessing improved catalyst performance.

Another object of the invention is to provide a process for preparing a reaction layer of a gas permeable electrode wherein an electrolyte penetrating passage and a gas diffusion passage can be formed as intended without disconnection.

The present invention for preparing a reaction layer of a gas permeable electrode comprises mixing a plurality of powders and a binding agent, hot-pressing the mixture, and then rapidly cooling the mixture under the hot-pressing conditions or immediately after the hot-pressing to prepare the reaction layer. Pursuant to the invention, the said cooling step is preferably effected at a cooling rate greater than 5° C./second.

Since the mixture of the powders is rapidly cooled while keeping the conditions of the hot-pressing in the present invention, the powders at the time of sintering are not relaxed so that an electrolyte penetrating passage and a gas diffusion passage are not disconnected. Accordingly, an electrolyte penetrates all the electrolyte penetrating passages and a gas penetrates all the gas diffusion passages so as to produce sufficient contact area between the electrolyte and the gas so that a gas permeable electrode with high catalyst performance is prepared.

DETAILED DESCRIPTION OF THE INVENTION

Figure 1:
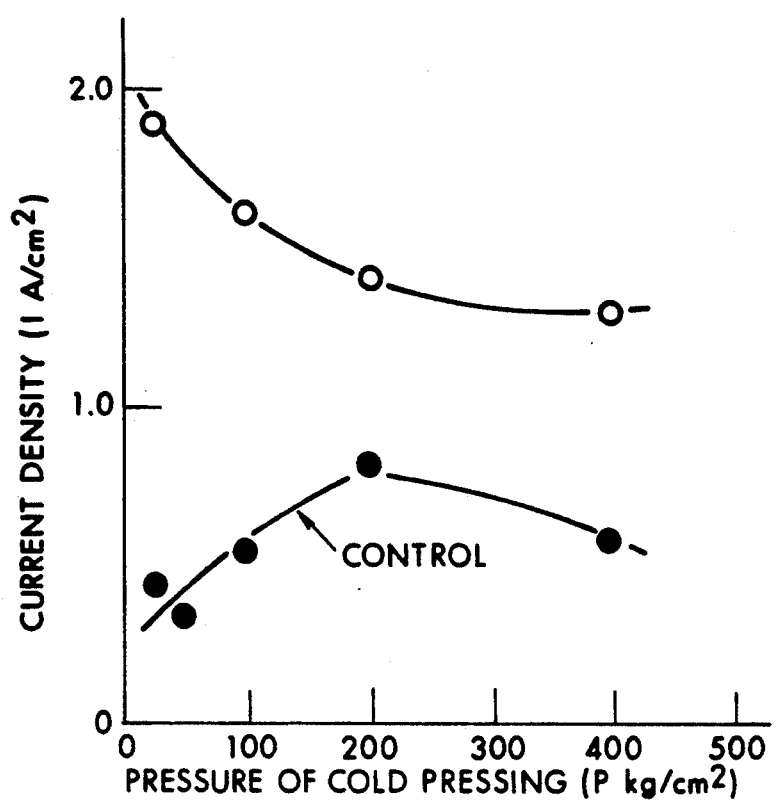
FIG. 1 is a graph of current densities achieved in a series of electrodes in accordance with the invention, as compared to conventionally prepared electrodes.

The materials constituting the reaction layer of the present invention include carbon powder and a suitable hydrophobic binding agent. The hydrophobic binding agent is preferably a fluorine-containing organic polymer, typically PTFE. The carbon powder may be hydrophilic or hydrophobic. The commercially available hydrophobic carbon powder can be converted into hydrophilic carbon powder by bonding a hydrophilic functional group such as a hydroxyl group to the surface thereof.

In order to further increase the catalyst performance, a platinum group metal and/or its oxide may be supported on the carbon powder. A method frequently used for preparing the gas permeable electrode comprises supporting ultrafine platinum group metal particles on the carbon powder dispersed in a solvent, applying the dispersion liquid of the carbon powder and the PTFE onto a porous body also functioning as a current collector, and hot-pressing the member to prepare an electrode. Another method which can be employed comprises impregnating the mixed powder with a platinum group metal compound solution. For example, the hydrophilic carbon powder and the PTFE powder are mixed with a platinum group metal compound solution to make a paste, the paste is applied onto a porous member also functioning as a current collector and the member is dried. The platinum group metal compound is then decomposed by hot-pressing during sintering, further reducing the compound. A still further method substantially consists of impregnating the formed reaction layer with a platinum group metal compound solution, heating the solution to decompose the compound and further reducing it.

The conditions for hot-pressing are not restricted, and the normal conditions heretofore employed are preferably employed for hot-pressing the mixture of the carbon powder and the binding agent. Accordingly, the hot-pressing temperature may be from about 150° C. to the deterioration or decomposition temperature of the materials. Further, the pressure thereof may range from about 10 kg/cm$^2$ to the deterioration or decomposition pressure of the materials.

The hot-pressed or sintered mixture is then cooled under the hot-pressing conditions or is rapidly cooled immediately after the hot-pressing while substantially keeping all the hot-pressing conditions except for temperature. The rate of the cooling is so adjusted as to retain the state of the hot-pressing as much as possible.

The thus obtained reaction layer is preferably joined with a hydrophobic gas permeable layer comprising sintered mixture powder of hydrophobic carbon and PTFE. Alternatively, a current collector, such as a carbon paper hydrophobically treated, may be employed as a gas permeable layer playing the two roles.

When the gas permeable electrode thus obtained is employed, for example, in a fuel cell, the ratio of the catalyst sites which can take part in a reaction is higher so that the current density is more than twice as large as that of an ordinary electrode.

The following Examples are illustrative of the invention and are not intended to be delimitive thereof.

EXAMPLE I

After hydrophilic carbon powder of which an average particle size was 400 Å, hydrophobic carbon powder of which an average particle size was 400 Å and PTFE of which an average particle size was 0.2 μm were dispersed and mixed in the ratio of 7:7:6 in a dispersion liquid and dried, 1.2 g of the mixed and dried powder was charged in a molding die having 100 mm of length and 100 mm of width and was hot-pressed for five seconds under a pressure of 600 kg/cm$^2$ and a temperature of 360° C. Thereafter, the powder was rapidly cooled to 25° C. for five seconds by water cooling while it was kept in the die during cooling to prepare a reaction layer having 100 mm of length, 100 mm of width and 0.1 mm of thickness. The reaction layer was attached to a gas permeable layer having the same dimension to prepare a gas permeable electrode.

A similar reaction layer supporting 0.56 mg/cm$^2$ of platinum was prepared according to a normal wet reduction method. The gas permeable electrode employing this reaction layer exhibited in a sulfuric acid electrolyte at 60° C. current densities of 3 A/cm$^2$ at 25 mV for hydrogen oxidation, 0.6 A/cm$^2$ at 800 mV (versus standard hydrogen electrode) and 2 A/cm$^2$ at 750 mV (versus standard hydrogen electrode), respectively, for oxygen reduction. These values are more than twice those for ordinary electrodes.

About 75% of the platinum catalysts employed in the above oxidation or reduction reaction were found to take part in the respective reactions. Said value of the catalyst percentage dipped in the electrolyte and taking part in the electrode reaction was determined by means of voltammetry employing hydrogen adsorption-desorption. The value is more than twice as that for ordinary electrodes prepared according to prior art methods.

In order to demonstrate the good gas supply, a so-called Tafel curve showing the relation between potential and current density can be obtained, to clarify to what extent the curve shows a linear relation. For this electrode, a linear relation was realized up to a current density of 3.2 A/cm$^2$, while such a linear relation was obtained only below 1 A/cm$^2$ for an ordinary prior art electrode.

EXAMPLE II

Four powdered samples were prepared as in Example I except that platinum was deposited on the hydrophilic carbon powder at a density of 0.28 mg/cm$^2$. The samples were cold-pressed at respectively four pressures (P in kg/cm$^2$ in FIGS. 1 and 2) to attain excellent cohesion among the powder. The four powder samples were separately hot-pressed under a pressure of 5 kg/cm$^2$ and a temperature of 360° C. in a die. Thereafter, the four powder samples in the die were rapidly cooled to room temperature for 30 seconds (at a rate of about 11.2° C./second) by means of water cooling while controlling the water temperature (employing at first hot water and then cold water) to prepare a reaction layer and then a gas permeable electrode the same as those of Example I.

The upper curve in FIG. 1 shows the relation between the above pressures for cold-pressing and a current density the above gas permeable electrode exhibited in 100% phosphoric acid.

Figure 2:
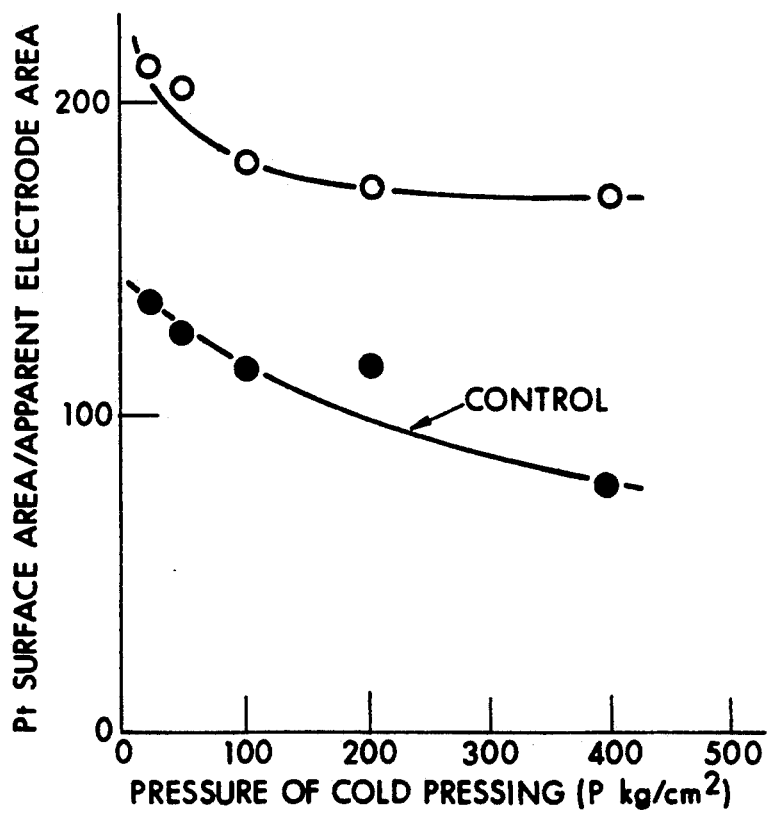
FIG. 2 is a graph of the ratio of platinum surface area to apparent electrode area for a series of electrodes produced by the invention, in comparison to control electrodes.

The upper curve in FIG. 2 shows the relation between the above pressures for cold-pressing and (a platinum surface area/an apparent electrode area).

As controls the same, four powdered samples of Example 2 which had been cold-pressed were sintered at 360° C. with no pressure applied. The four powdered samples were spontaneously cooled in air to prepare a reaction layer and then a gas permeable electrode. The relation between the pressure for cold-pressing and current densities which these gas permeable electrodes exhibited in 100% phosphoric acid, is shown in the lower curve of FIG. 1. The relation between the pressure for cold-pressing and platinum surface area of this gas permeable electrode (relative value) is shown in the lower curve in FIG. 2. The vast improvement in performance achieved by the method of the invention will be evident.

The invention may be embodied in other forms or carried out in other ways without departing from the spirit or essential characteristics thereof.

What is claimed is:

1. A process for preparing a reaction layer of a gas permeable electrode which comprises mixing carbon powder and a hydrophobic binding agent, hot-pressing the mixture and thereafter rapidly cooling the mixture in a die at a rate of at least 5° C./second, while remaining in the die, to prepare the reaction layer.

2. A process in accordance with claim 1, wherein said mixture is cooled while being maintained in the die.

3. A process in accordance with claim 1, wherein said binding agent comprises polytetrafluoroethylene.

4. A process in accordance with claim 1, wherein said mixture is cold pressed to achieve cohesion of the powder, before said hot-pressing.

5. A gas permeable electrode prepared by the process of claim 1.

* * * * *